US011255224B2

(12) United States Patent
Preitl et al.

(10) Patent No.: US 11,255,224 B2
(45) Date of Patent: Feb. 22, 2022

(54) METHOD FOR THE SHORT-TERM ADJUSTMENT OF THE OUTPUT OF A COMBINED-CYCLE POWER PLANT STEAM TURBINE, FOR PRIMARY FREQUENCY CONTROL

(71) Applicant: Siemens Energy Global GmbH & Co. KG, Munich (DE)

(72) Inventors: Zsuzsa Preitl, Erlangen (DE); Frank Thomas, Erlangen (DE); Bernd Weissenberger, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 331 days.

(21) Appl. No.: 16/319,897

(22) PCT Filed: Aug. 24, 2017

(86) PCT No.: PCT/EP2017/071298
§ 371 (c)(1),
(2) Date: Jan. 23, 2019

(87) PCT Pub. No.: WO2018/059840
PCT Pub. Date: Apr. 5, 2018

(65) Prior Publication Data
US 2019/0271239 A1     Sep. 5, 2019

(30) Foreign Application Priority Data
Sep. 28, 2016    (DE) .................... 10 2016 218 763.5

(51) Int. Cl.
*F01K 7/20*     (2006.01)
*F01K 23/10*    (2006.01)
*F01K 13/02*    (2006.01)

(52) U.S. Cl.
CPC .............. *F01K 23/101* (2013.01); *F01K 7/20* (2013.01); *F01K 13/02* (2013.01); *F05D 2220/72* (2013.01); *Y02E 20/16* (2013.01)

(58) Field of Classification Search
CPC . F01K 7/20; F01K 7/226; F01K 13/02; F01K 23/101
See application file for complete search history.

(56) References Cited

U.S. PATENT DOCUMENTS 3,306,044 A * 2/1967 Zwetz ...................... F01K 7/20
                                                       60/662
4,461,258 A * 7/1984 Becker ................ F02D 41/1475
                                                       123/681

(Continued)

FOREIGN PATENT DOCUMENTS

CN     103097671 A    5/2013
CN     103492678 A    1/2014

(Continued)

OTHER PUBLICATIONS

International search report and written opinion dated Feb. 9, 2018 for corresponding PCT/EP2017/071298.

*Primary Examiner* — Todd E Manahan
*Assistant Examiner* — Marc J Amar

(57) ABSTRACT

A method for the short-term adjustment of the output of a steam turbine of a combined-cycle power plant, includes: opening, respectively closing, a backed-up turbine valve of a pressure stage, according to a required change in output; comparing a desired pressure with a pressure measurement upstream of the turbine valve to measure pressure of steam mass flow flowing into the pressure stage; and opening, respectively closing, a feed line for introducing a variable proportion of water into the steam mass flow as soon as the pressure falls below or exceeds the desired pressure; the variable proportion of water is introduced into the steam (Continued)

mass flow until an adjusted desired steam temperature is reached, which is determined from the difference between a basic specified desired steam temperature and the default value of a controller which operates at least proportionally and evaluates the difference between the pressure measurement and the desired pressure.

5 Claims, 1 Drawing Sheet

(56) References Cited

U.S. PATENT DOCUMENTS

| | | | |
|---|---|---|---|
| 6,442,924 B1* | 9/2002 | Talley | F01K 23/103 |
| | | | 60/39.182 |
| 2002/0194832 A1 | 12/2002 | Smith | |
| 2009/0320493 A1 | 12/2009 | Olia et al. | |
| 2013/0167504 A1* | 7/2013 | Bruckner | F01K 23/10 |
| | | | 60/39.182 |
| 2013/0186091 A1* | 7/2013 | Effert | F01K 11/02 |
| | | | 60/653 |
| 2013/0327043 A1 | 12/2013 | Brückner et al. | |
| 2015/0007578 A1* | 1/2015 | Carroni | F01K 7/226 |
| | | | 60/772 |
| 2016/0208656 A1* | 7/2016 | Bruckner | F01K 7/165 |
| 2016/0208657 A1* | 7/2016 | Bruckner | F03G 6/06 |

FOREIGN PATENT DOCUMENTS

| | | | | |
|---|---|---|---|---|
| DE | 19750125 A1 * | 3/1999 | | F01K 13/02 |
| DE | 19750125 A1 | 3/1999 | | |
| DE | 102010040623 A1 | 3/2012 | | |
| KR | 19980034484 A | 8/1998 | | |
| KR | 20020062760 A | 7/2002 | | |

* cited by examiner

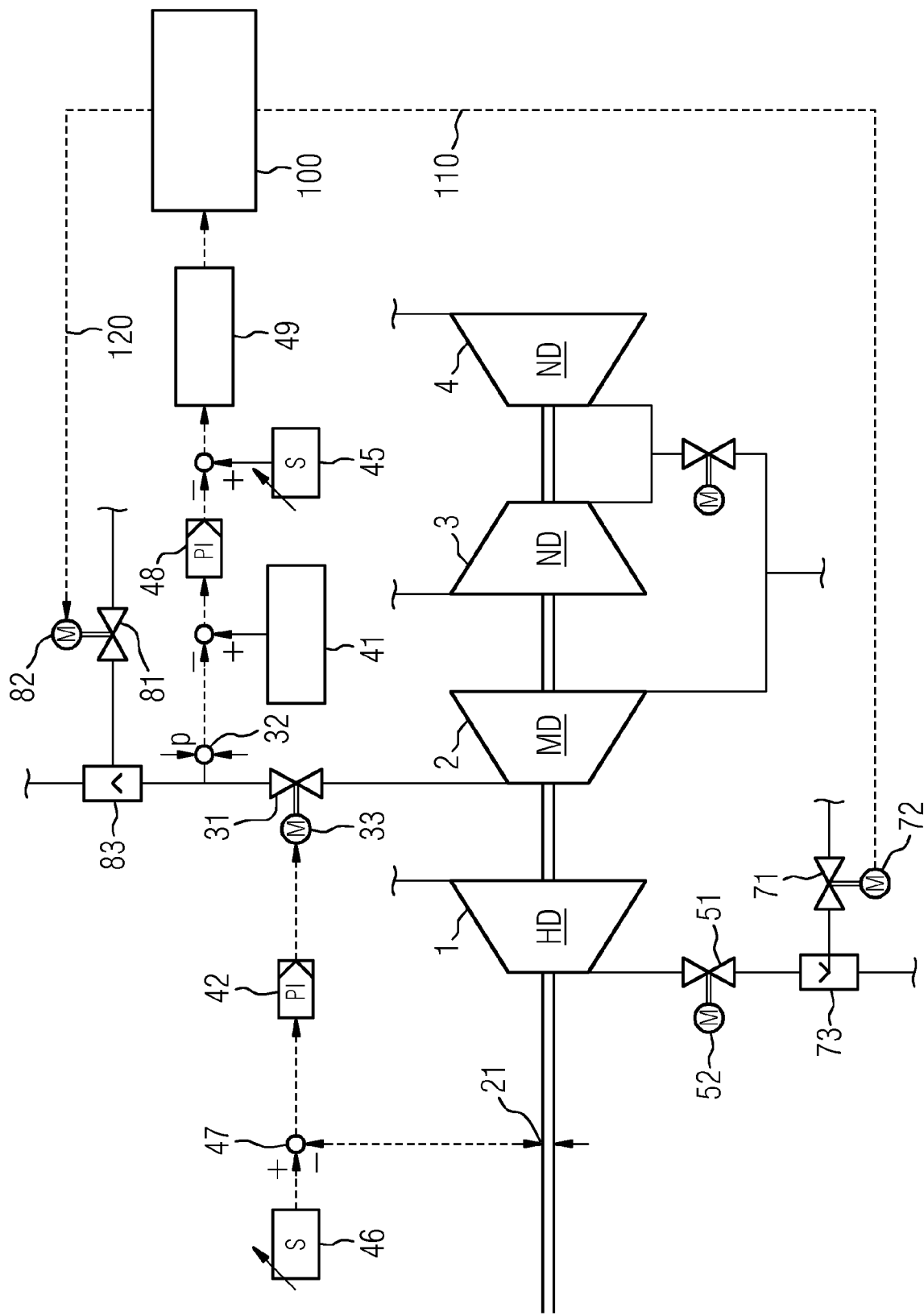

METHOD FOR THE SHORT-TERM ADJUSTMENT OF THE OUTPUT OF A COMBINED-CYCLE POWER PLANT STEAM TURBINE, FOR PRIMARY FREQUENCY CONTROL

CROSS REFERENCE TO RELATED APPLICATIONS

This application is the US National Stage of International Application No. PCT/EP2017/071298 filed Aug. 24, 2017, and claims the benefit thereof. The International Application claims the benefit of German Application No. DE 10 2016 218 763.5 filed Sep. 28, 2016. All of the applications are incorporated by reference herein in their entirety.

FIELD OF INVENTION

The invention relates to a method for the brief power matching of a steam turbine of a gas and steam turbine plant, for primary regulation.

BACKGROUND OF INVENTION

Primary regulation is described in DE 10 2010 040 623 A1 and DE 197 50 125 A1, for example. Modern power plants are required on the one hand to deliver high degrees of efficiency and on the other hand to operate as flexibly as possible. Apart from short start-up times and high load-change speeds, this also includes the possibility of compensating for frequency disturbances in the network. In order to meet these requirements, the power plant has to be able to provide extra powers of, for example, 5 percent and more within a few seconds and then ensure this extra power for a required minimum time period of, for example, 15 minutes.

This is normally realized in a conventional gas and steam power plant by an increase in load of the gas turbine. However, under certain circumstances, it can be particularly expedient, in particular in the upper load range, for the desired increase in power to be provided not exclusively by the gas turbine, but also by an adequate incorporation of the water-steam circuit which feeds the steam turbine. Consequently, solutions in which the steam turbine likewise can and should provide an additional contribution to the frequency support have been increasingly pursued again in recent times. Normally, use is then made here of methods which, on the one hand, do not lead to any additional investment costs (for example due to the requirement for additional components) and, on the other hand, do not negatively impact the normal system operation, for example bring about a loss of efficiency during steady-state operation.

In this regard, in recent times, solutions which essentially use, in a suitable manner, the thermal energy stored in the metal masses of the heating surfaces have been developed for heat recovery steam generators. This is mainly realized by rapid changes in the manipulated feed water and injection water variables.

More extensive theoretical investigations have now revealed that, although a relatively large second reserve potential exists through the use of the aforementioned thermal store, said potential may be retrieved only in a manner relatively delayed in terms of time or sluggishly. With regard to the primary regulation reserve, in the case of which response to rapid changes in the network frequency is necessary by definition, such measures are however not completely suitable.

SUMMARY OF INVENTION

It is therefore an object of the invention to provide a method for the brief power matching of a steam turbine of a gas and steam power plant, for primary regulation.

Said object is achieved by the method according to the features of the independent claim.

The method according to the invention for the brief power matching of a steam turbine of a gas and steam power plant, for primary regulation, comprises here the following steps:—opening or closing a backed-up turbine valve of at least one pressure stage of the steam turbine in a manner dependent on a required change in power,—comparison of a predefined pressure target value with a pressure measurement which provides, upstream of the backed-up turbine valve, a measurement of the pressure of the steam mass flow flowing into the at least one pressure stage,—opening or closing of a feed for introducing a variable water fraction into the steam mass flow of at least one of the pressure stages as soon as the pressure target value is fallen below or exceeded,—wherein the variable water fraction is introduced into the steam mass flow until a matched steam temperature target value is reached, this being determined from the difference between a predefined basic steam temperature target value and the output value of a regulator which has at least proportional action and which evaluates and compensates for the difference between the pressure measurement and the pressure target value. The regulator, having at least proportional action, may in this case be for example a P, PID or, advantageously, a PI regulator.

Precisely in the case of the requirement for additional power for the primary regulation, it is thus the case that a quick measure, namely the opening of a throttled turbine valve, is combined with a long-acting measure, namely the increase in the injection quantity or in the feed water mass flow. This therefore results here in a combination of power regulation for quick power matching and pressure support during the power matching. For this purpose, at least one turbine valve has to be sufficiently throttled. If then additional power is necessary, it is possible under these circumstances to provide an increased mass flow through the steam turbine by opening the at least one throttled turbine valve via a pressure discharge means. It is generally known that this occurs relatively swiftly, and this measure is thus best suited for the speed requirements with regard to a primary regulation reserve. However, it is also known that, for acceptable degrees of throttling of the turbine valve, this measure is very greatly limited in terms of time. It is precisely this that is the starting point for the present invention. In the case of a corresponding requirement for additional power, the one measure, namely the opening of the at least one throttled turbine valve, is combined with a further measure, namely the increase in the injections or in the feed water mass flow. Here, the opening of the at least one turbine valve ensures the quick and the increase in the injections or in the feed water quantity ensures a long-lasting power increase of the steam turbine, this being desirable in particular in the case of the primary regulation reserve.

The invention becomes implementable in practice in that the additionally requested power is provided by opening at least one turbine valve, for example in the form of a type of power regulation of the steam turbine. In this way, however, the steam pressure of the corresponding pressure stage is reduced immediately (the store is "emptied"). However, the fact that then, due to the increase in the injection quantity or in the feed water quantity, also the thermal energy store is "tapped into" means that the reduction in the steam pressure can be efficiently counteracted. By contrast, if in the reverse case the steam pressure rises when closing the turbine valve (the valve closing in the case of lower power requirement of the network), it is likewise possible for the increase in pressure to be effectively counteracted due to the reduction in the injection quantities or in the feed water mass flow. The steam store thus acts as a buffer element for the thermal energy stored in the metal masses such that, despite its sluggish behavior during release, with the primary regulation reserve, use can be made of said stored energy via the indirect route involving the "quick" steam store.

It has turned out to be particularly advantageous if the opening or closing at the turbine valve of the medium-pressure stage of the steam turbine is realized. This allows use to additionally be made of the steam store in the drum of the medium-pressure stage. It has been found that, compared with throttling for the high-pressure stage, the throttling for the medium-pressure stage is significantly less sensitive with regard to possible vibration tendency.

Preferably, said throttling of the medium-pressure stage is supplemented in that the feeding of a variable water fraction into the steam mass flow flowing into the high-pressure stage of the steam turbine is realized. For such a combination of pressure support on the part of the high-pressure stage and power regulation exclusively on the part of the medium-pressure stage, varying power outputs of the steam turbine via different degrees of opening of the turbine valve of the medium-pressure stage and the changes, linked thereto, in the injection or feed quantity in the high-pressure stage for pressure support of the medium-pressure stage are no longer directly coupled to one another, which has a further stabilizing effect.

Particularly high flexibility is achieved if the introduction of a variable water fraction and the opening or closing of turbine valves is realized in a plurality of the pressure stages of the steam turbine. Ultimately, however, the decision as to which combination possibilities are most expedient for which change profile will have to be made to on a case-by-case basis. For each power plant system, it has to be individually established which pressure stage is to be throttled and cooled, and to what extent, against the background of the network and customer requirements and also available design reserves.

Further embodiments of the present invention can be gathered from the dependent claims.

BRIEF DESCRIPTION OF THE DRAWINGS

The invention will be explained by way of example below on the basis of a FIGURE.

DETAILED DESCRIPTION OF INVENTION

The FIGURE schematically shows a detail of a gas and steam power plant with a high-pressure stage 1, a medium-pressure stage 2 and two low-pressure stages 3 and 4 of a steam turbine. Here, all the stages 1 to 4 are connected to one another via a rotor axle.

As has been found in dynamic simulations, it can be particularly advantageous to throttle the turbine valve 31 for the medium-pressure stage 2. Firstly, a medium-pressure drum (not illustrated in more detail) may be used here as an additional steam accumulator, and secondly, it has been found that, in the case of throttling on the high-pressure side, the high-pressure stage behaves significantly more sensitively with regard to vibration tendencies due to the associated interplay of a changed opening position of the high-pressure turbine valve 51 and a changed high-pressure steam mass flow as a result of the changed high-pressure feed water and high-pressure injection quantity. By contrast, an overall stabilizing effect is achieved in the case of exclusive throttling for the medium-pressure stage 2 via different degrees of opening of the turbine valve 31 of the medium-pressure stage and a change, indirectly linked thereto via the regulating device 100, of the injection and feed-water quantity of the high-pressure stage 1 since the two measures are not applied to the same pressure level and are thus no longer directly coupled to one another. The core concept of the present invention is thus to combine power regulation via the position of a turbine valve with pressure regulation via the increase or reduction of the injection quantity. Consequently, there are essentially two regulation circuits. That is to say, the pressure regulation is no longer realized via the turbine valve but only via the change in the injection. It goes without saying that, here too, limits have to be complied with, that is to say the steam temperature may not be reduced or increased beyond a specific amount, or, in the case of closed injection, further closure may not be performed, etc.

The exemplary embodiment illustrated in the FIGURE also shows that different combinations are conceivable. In this regard, in the embodiment shown here, the power regulation is realized via the components 21, 46, 47, 42, 33 and the turbine valve 31 of the feed to the medium-pressure stage, while the pressure regulation for stabilization is mainly realized via the components 32, 41, 48, 45, 49, 100, 110, 72, 71 and the injection means 73, downstream of which there is further arranged a high-pressure superheater heating surface (not illustrated in more detail here), in the feed to the high-pressure stage. Furthermore, as is illustrated in the present exemplary embodiment, it can be advantageous for the regulating device 100 to regulate in a pressure-stabilizing manner not only the injection quantity for the high-pressure stage 1, but at the same time the injection quantity for the medium-pressure stage 2 itself via the components 120, 81, 82 and the injection means 83, downstream of which there is also further arranged an intermediate superheater heating surface (not illustrated in more detail here). This has the advantage that, in addition to the use of the thermal energy stored in the metal masses of the high-pressure stage 1, use may also be made of the thermal energy stored in such an intermediate superheater heating system for pressure assistance. Under these circumstances, one possibility is to provide a primary regulation reserve with equal component loading of the high-pressure stage over a relatively long time period, or to reduce the change in the steam temperature of the high-pressure stage with equal duration of the primary regulation reserve, this resulting in a reduction in the component loading of the high-pressure stage. The other possibility, which has its own advantages and disadvantages, would of course be to realize the power regulation via one of the other turbine valves, regardless of which injection is used for pressure stabilization.

The power regulation is realized via the turbine valve 31 of the medium-pressure stage 2. For this purpose, the current power output of the steam turbine is determined at the rotor via a measuring device 21 and compared with an associated power target value, which can be repeatedly reset in a manner dependent on the required primary regulation reserve. In the case of a difference between the two values—this corresponding to a "required change in power"—targeted matching of the opening position of the turbine valve 31 then takes place, specifically such that the target and actual values are again identical at the end. The pressure regulation is substantially realized by a changed introduction of a variable water fraction into the steam mass flow for the high-pressure stage 1 by means of the injection cooling means 73, this advantageously being realized as an intermediate injection device of a high-pressure superheater heating surface (not illustrated in more detail here). Optionally provided here in addition is an additional changed introduction of a variable water fraction into the steam mass flow for the medium-pressure stage 2 by means of the injection cooling means 83, this also advantageously being realized here as an intermediate injection device of an intermediate superheater heating surface (not illustrated in more detail here). For this purpose, a predefined pressure target value 41 is compared with a pressure measurement 32 of the steam mass flow. Here, the pressure measurement 32 is carried out upstream of the backed-up turbine valve 31. As soon as the pressure target value 41 is fallen below or exceeded, the opening or closing of the feeds 71 and 81 is realized via corresponding activation means 72 and 82, with the result that a changed water fraction is fed to the injection cooling means 73 and 83. This variable water fraction is introduced into the steam mass flow until a matched steam temperature target value 49 is reached. In the present example, this is determined from the difference between a predetermined basic steam temperature target value 45 and the output value of a proportional-integral-(PI-) action regulator 48, which evaluates and compensates for the difference between the pressure measurement 32 and the pressure target value 41. In the regulating device 100 which follows, this temporally variable steam temperature target value is predefined and used as a variable input variable for the steam temperature regulating device 100. Instead of the PI regulator 48, it would be equally possible for a simple P regulator or also a PID regulator or else some other regulator with equivalent action to be used, wherein, in the present example, the PI regulator has proven to be advantageous.

The invention claimed is:

1. A method for brief power matching of a steam turbine of a gas and steam power plant, for primary regulation, which turbine has pressure stages comprising at least a high-pressure stage, a medium-pressure stage and a low-pressure stage, comprising:

opening or closing a medium-stage turbine valve of the medium-pressure stage of the steam turbine in a manner dependent on a required change in power, comparing a predefined pressure target value with a pressure measurement, upstream of the medium-stage turbine valve, which provides a measurement of the pressure of a first steam mass flow flowing into the medium-pressure stage, opening or closing of a feed for introducing a variable water fraction into the first steam mass flow of the medium-pressure stage or into a second steam mass flow of the high-pressure stage as soon as the pressure measurement has fallen below or has exceeded the pressure target value, wherein the variable water fraction is introduced into the steam mass flow until a steam temperature target value is reached, which is determined from a difference between a predefined basic steam temperature target value and an output value of a regulator which has at least proportional action and which evaluates and compensates for the difference between the pressure measurement and the pressure target value.

2. The method as claimed in claim 1, wherein the introduction of the variable water fraction into the first steam mass flow or the second steam mass flow is realized by an injection cooling device.

3. The method as claimed in claim 1, wherein the introduction of the variable water fraction into the first steam mass flow or the second steam mass flow is realized by a change in the feed-water mass flow flowing into a steam generator arranged upstream of the steam turbine.

4. The method as claimed in claim 1, wherein the feeding of the variable water fraction into the second steam mass flow flowing into the high-pressure stage of the steam turbine is realized.

5. The method as claimed in claim 1, wherein the introduction of the variable water fraction, and the opening or closing of the turbine valve and a turbine valve of at least one other pressure stage, is realized in a plurality of the pressure stages of the steam turbine.

\* \* \* \* \*